(12) United States Patent
Richards et al.

(10) Patent No.: US 6,712,912 B2
(45) Date of Patent: Mar. 30, 2004

(54) WELDING METHOD, FILLER METAL COMPOSITION AND ARTICLE MADE THEREFROM

(75) Inventors: Douglas K. Richards, North Apollo, PA (US); Phillip Dowson, Greensburg, PA (US)

(73) Assignee: Elliott Turbomachinery Co., Inc., Jeannette, PA (US)

( * ) Notice: Subject to any disclaimer, the term of this patent is extended or adjusted under 35 U.S.C. 154(b) by 0 days.

(21) Appl. No.: 10/258,404

(22) PCT Filed: Apr. 27, 2001

(86) PCT No.: PCT/US01/13625

§ 371 (c)(1),
(2), (4) Date: Oct. 23, 2002

(87) PCT Pub. No.: WO01/83840

PCT Pub. Date: Nov. 8, 2001

(65) Prior Publication Data

US 2003/0056862 A1 Mar. 27, 2003

Related U.S. Application Data

(60) Provisional application No. 60/200,323, filed on Apr. 28, 2000.

(51) Int. Cl.$^7$ .............................. C22C 38/44; C21D 9/50
(52) U.S. Cl. ...................... 148/325; 148/516; 148/529; 219/146.23; 420/67; 428/682
(58) Field of Search ................................ 148/325, 516, 148/529; 420/6; 428/606, 682; 416/223 R, 213 R; 219/146.23

(56) References Cited

U.S. PATENT DOCUMENTS

| | | |
|---|---|---|
| 3,581,054 A | 5/1971 | Bjorkroth |
| 3,769,003 A | 10/1973 | Kenyon |
| 4,090,813 A | 5/1978 | Minato et al. |
| 5,556,561 A | 9/1996 | Ishikawa et al. |
| 5,879,132 A | 3/1999 | Usami et al. |
| 6,042,782 A | 3/2000 | Murata et al. |
| 6,159,310 A | 12/2000 | Inoue et al. |

FOREIGN PATENT DOCUMENTS

| | | | | |
|---|---|---|---|---|
| JP | 50-5244 | * | 1/1975 | |
| JP | 7-185879 | * | 7/1995 | ........... B23K/35/30 |

OTHER PUBLICATIONS

English abstract of Russian patent 846185B, publication date Jul. 15, 1981.*

* cited by examiner

Primary Examiner—Deborah Yee
(74) Attorney, Agent, or Firm—Webb Ziesenheim Logsdon Orkin & Hanson, P.C.

(57) ABSTRACT

A weld filler metal alloy composition and a method for welding stainless steel components into a final assembly includes the steps of: austenitizing the stainless steel components to be welded at a temperature of 1800° F.–2000° F.; applying, using conventional arc welding techniques a solid wire of the filler metal alloy comprising in % by weight: up to 0.02% carbon; up to 0.8% manganese; up to 0.02% phosphorus; up to 0.015% sulfur; up to 0.6% silicon; 4.5–5.5% nickel; 0.4–0.7% molybdenum; 10–12.5% chromium; up to 0.1% copper; balance essentially iron and incidental impurities; and tempering the welded assembly welded at a temperature of 930° F.–1300° F. A second tempering step conducted at a temperature of 1095° F.–1145° F. may follow. The welding method can be used to make compressor impellers (6). The compressor impeller components comprise 13Cr-4Ni stainless steel.

22 Claims, 1 Drawing Sheet

WELDING METHOD, FILLER METAL COMPOSITION AND ARTICLE MADE THEREFROM

This application claims the benefit of provisional application No. 60/200,323 filed Apr. 28, 2000.

BACKGROUND OF THE INVENTION

1. Field of the Invention

The present invention relates generally to a welding method and filler material for joining stainless steel components and, more particularly, relates to a welding method and filler material capable of forming a clean weld metal with high corrosion resistance in petrochemical environments combined with high mechanical properties, such as tensile strength and toughness at low temperatures.

2. Background Art

Stainless steel is usually welded by using filler metals in the form of welding rod or wire with a chemical composition substantially the same as that of the base stainless steel. In doing so, some problems regarding depression of mechanical properties and corrosion resistance of the weld metal may arise due to the type of base metal being joined. This can be particularly troublesome when the welded assembly is used in corrosive environments, such as those found in the petrochemical industry, where hydrogen sulfide exposure is a problem. Such exposure can lead to excessive corrosion, especially on the weld metal. Excessive corrosion may eventually result in the premature failure of the weld.

For welded assemblies that are subject to high shear stress, such as impellers used in compressors, depression of the mechanical properties and excessive corrosion of the weld metal may not only result in weld failure but could also damage other parts of the compressor. The impellers must also maintain their properties at extreme temperature conditions, such as, for example, the extreme cold typically encountered during the winter months in the oil fields of Alaska or the North Sea.

Weld filler metal alloys for welding stainless steel are typically made of iron and various other alloying elements and typically include:

(1) Carbon, an excessive amount of which precipitates as carbides and consumes chromium and other functional alloying elements and lowers their effective content.

(2) Silicon, which, although a useful element as a deoxidizing agent, is detrimental to the toughness of the weld metal. In particular, more than 1% by weight silicon content accelerates the production of intermetallic compounds, for example, sigma phase, and lowers the corrosion resistance and toughness of the weld metal.

(3) Manganese is an effective deoxidizing element and increases solubility of nitrogen in the weld metal. More than 1.5% by weight manganese unfavorably lowers the corrosion resistance and toughness of the weld metal.

(4) Phosphorus is unavoidably brought from steel-making materials and remains in the resulting steel alloy as an impurity thereof. It is preferable to keep the phosphorus content as low as possible. More than 0.04% by weight phosphorus content lowers the pitting corrosion resistance and toughness and increases the sensitivity to high-temperature cracking.

(5) Sulfur, similar to phosphorus, is unavoidably introduced from steel-making materials and remains in the resulting steel alloy as an impurity. More than 0.02% by weight sulfur lowers the pitting corrosion resistance and increases the sensitivity to high-temperature cracking.

(6) Nickel is an austenite-stabilizing element and suppresses the formation of ferrite phase in the weld metal.

(7) Chromium is necessary in order to ensure sufficient corrosion resistance of the stainless steel. An excess of chromium promotes a precipitation of intermetallic compounds, for example, sigma phase, and greatly lowers the toughness of the steel.

(8) Molybdenum is an element that increases the pitting corrosion resistance of the weld metal. It can promote a precipitation of sigma phase. A suitable amount of molybdenum increases the pitting corrosion resistance of the weld metal, without promoting the precipitation of sigma phase.

(9) Copper improves corrosion resistance, in particular, resistance to sulfuric acid. However, copper lowers the toughness of the weld metal.

U.S. Pat. No. 6,042,782 to Murata et al. discloses a welding material for use in consumable or non-consumable electrode welding of stainless steel, capable of forming a weld metal with excellent corrosion resistance and mechanical properties. The welding material is a composite welding wire composed of a steel shell and a filler material enveloped by the steel shell.

U.S. Pat. No. 5,556,561 to Ishikawa et al. discloses a method of forming a weld joint between an austenitic stainless steel and a ferritic steel. This method forms a clean weld metal with high corrosion resistance and high mechanical properties, such as tensile strength and toughness.

Tough, corrosion-resistant, martensitic, stainless steel alloys, such as 13Cr-4Ni stainless steel, are preferred for use as impellers, such as those used in compressors intended for low temperature, petrochemical service. However, commercially available, prior art weld filler metals do not provide the requisite corrosion resistance in hostile environments and strength at extremely cold temperatures.

Accordingly, a need exists for the development of a method and filler material to weld tough, corrosion-resistant assemblies of stainless steel elements such as 13Cr-4Ni alloy material for uses, such as for impellers used in compressors, that maintain their properties in corrosive or extremely cold environments.

SUMMARY OF THE INVENTION

The present invention is directed to a metal alloy that can be used as a filler metal for the welding of stainless steel components into a final assembly, particularly type 13Cr-4Ni stainless steel components. The filler metal alloy for welding includes in % by weight: up to 0.02% carbon; up to 0.8% manganese; up to 0.02% phosphorus; up to 0.015% sulfur; up to 0.6% silicon; from 4.5%–5.5% nickel; from 0.4%–0.7% molybdenum; from 10%–12.5% chromium; up to 0.1% copper; and the balance being essentially iron and incidental impurities.

The metal filler alloy more preferably consists essentially of in % by weight: 0.0001–0.02% carbon; 0.0001–0.8% manganese; 0.0001–0.02% phosphorus; 0.0001–0.015% sulfur; 0.0001–0.06 silicon; 4.5–5.5% nickel; 0.4–0.7% molybdenum; 10–12.% chromium; 0.0001–0.01% copper; balance essentially iron and incidental impurities.

The present invention is further directed to a method of welding stainless steel components, which includes the steps of:

(a) providing the stainless steel components to be welded, preferably formed from a type 13Cr-4Ni stainless steel alloy;

(b) austenitizing the stainless steel components to be welded at a temperature between 1800° F.–2000° F.;

(c) welding the austenitized components, using conventional arc welding techniques, utilizing a filler metal which includes in % by weight: up to 0.02%, and more preferably 0.0001–0.02% carbon; up to 0.8%, and more preferably 0.0001–0.8% manganese; up to 0.02%, and more preferably 0.0001–0.02% phosphorus; up to 0.015%, and more preferably 0.0001–0.015% sulfur; up to 0.6%, and more preferably 0.0001–0.6% silicon; 4.5–5.5% nickel; 0.4–0.7% molybdenum; 10–12.5% chromium; up to 0.1%, and more preferably 0.0001–0.01% copper; and the balance being essentially iron and incidental impurities to provide a welded assembly; and (d) tempering the welded assembly at a temperature between 930° F.–1300° F.

According to an embodiment of the method of the present invention, a compressor impeller is manufactured wherein the impeller components are stainless steel, preferably a type 13Cr-4Ni stainless steel, welded with the above-described filler metal alloy. The present invention is also directed to a compressor impeller made from components of stainless steel welded together by the filler metal of the present invention which is useful in low-temperature, petrochemical service providing improved mechanical and corrosion-resistant properties.

These and other advantages of the present invention will be clarified in the description of the preferred embodiment taken together with the attached drawings in which like reference numerals represent like elements throughout.

DETAILED DESCRIPTION OF THE PREFERRED EMBODIMENTS

Figure 1:
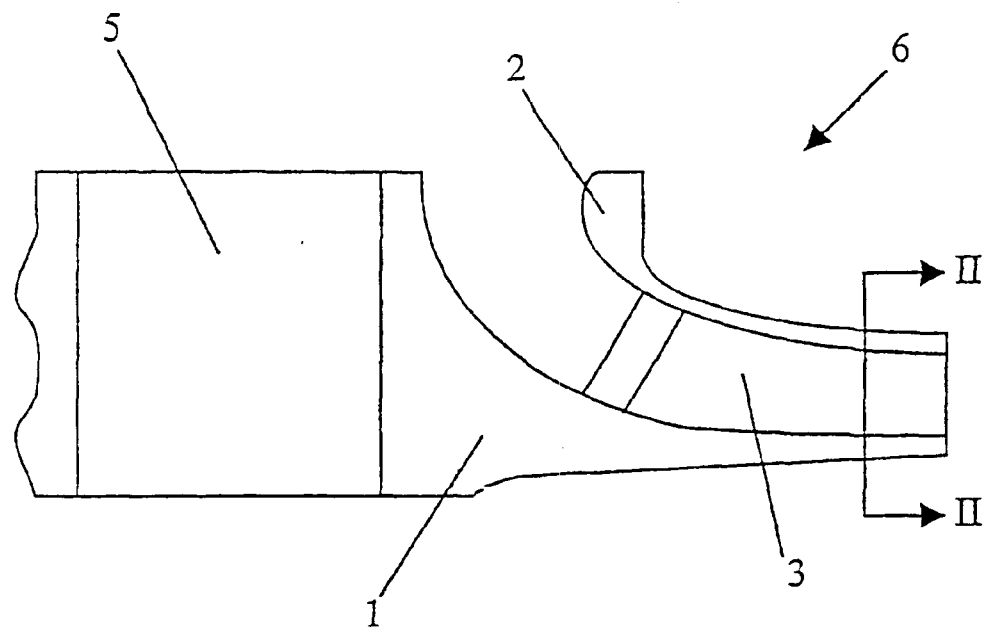
FIG. 1 is a partial, fragmented side elevation view of a stainless steel impeller fabricated according to the present invention.

The present invention provides a unique metal alloy composition for use as a filler metal when welding stainless steel, especially martensitic stainless steel components. Commercially available filler metals were evaluated from, among others, ESAB located in Sweden and TECHALLOY Company located in New Jersey, U.S.A. None of the filler metals were capable of producing weld deposits at the hardness level or with the low temperature properties required for compressor impellers. To overcome this problem, preferred filler metal alloy compositions to be used in welding the stainless steel components were developed. The filler metal alloy is particularly compatible with a preferred base metal, martensitic stainless steel and a particularly preferred base metal 13Cr-4Ni stainless steel. The filler metal alloy has a similar chemical composition to 13Cr-4Ni stainless steel.

The preferred composition of the filler metal alloy will vary depending on the method of welding to be employed and the type of welding rod or wire desired. When gas tungsten arc welding (hereinafter "GTAW") or submerged arc welding (hereinafter "SAW") techniques are to be used and the filler metal alloy is to be in the form of a solid rod or solid wire, the preferred filler metal alloy comprises in % by weight: up to 0.02%, or more preferably 0.0001–0.02% carbon; up to 0.6%, or more preferably 0.0001–0.6% manganese; up to 0.02%, or more preferably 0.0001–0.02% phosphorus; up to 0.015%, or more preferably 0.0001–0.015% sulfur; up to 0.06%, or more preferably 0.0001%–0.6% silicon; 4.5–5.0% nickel; 0.4–0.7% molybdenum; 10–12.5% chromium; up to 0.1%, or more preferably 0.0001–0.1% copper; the balance being essentially iron and incidental impurities.

When GTAW or SAW techniques are to be used and the filler metal alloy is to be in the form of a cored rod or cored wire, the preferred filler metal alloy comprises in % by weight: up to 0.02, or 0.0001–0.02% carbon; up to 0.6%, or 0.0001–0.6% manganese; up to 0.015%, or 0.0001–0.015% phosphorus; up to 0.015%, or 0.0001–0.015% sulfur; up to 0.3%, or 0.0001–0.3% silicon; 4.5–5.0% nickel; 0.4–0.7% molybdenum; 10–12.0% chromium; up to 0.1%, or 0.0001–0.1% copper; the balance being essentially iron and incidental impurities.

When shielded metal arc welding (hereinafter "SMAW") is to be used and the filler metal alloy is to be in the form of a covered electrode, the preferred filler metal alloy comprises in % by weight: up to 0.02%, or 0.0001–0.02% carbon; up to 0.8%, or 0.0001–0.8% manganese; up to 0.015%, or 0.0001–0.015% phosphorus; up to 0.015%, or 0.0001–0.015% sulfur; up to 0.3%, or 0.0001–0.3% silicon; 4.6–5.0% nickel; 0.4%–0.7% molybdenum; 10–12.0% chromium; up to 0.1%, or 0.0001–0.1% copper; the balance being essentially iron and incidental impurities.

The filler metal alloy must produce weld deposits that meet NACE MR0175 requirements for hydrogen sulfide service. This NACE standard tests the ability of the weld deposit to resist corrosion in hostile environments, such as those commonly encountered in the petrochemical industry. The filler metal alloy also must be capable of producing weld deposits that have the required low temperature toughness at temperatures as low as −152° F., typically specified for service in the North Sea oil field. This impact toughness is evaluated using the Charpy V-notch impact test.

The method of the present invention also provides optimum welding conditions that produce weld deposits that satisfy the various requirements outlined above. The general steps involved in the welding method of the present invention include:

(a) providing stainless steel alloy components to be joined, of a composition, such as type 13Cr-4Ni stainless steel, for corrosion resistance and good mechanical properties for low temperature service;

(b) austenitizing, where the stainless steel components are initially austenitized for a sufficient amount of time to ensure that the components soak evenly. This period of time should not be so long as to promote grain growth. The period of time for the austenitizing step will depend on the thickness of the metal components and will typically not exceed more than one hour for each inch of thickness of the metal component;

(c) welding, where the components are joined by welding using conventional arc welding methods. Preferred welding methods include GTAW, SAW and SMAW. The filler metal alloy composition of the present invention set forth above is used in either a solid rod, solid wire, cored rod, cored wire, or covered electrode form. It is preferred that the welding be done using no more than 50,000 joules per inch of welding heat input to form a welded assembly; and (d) tempering, where the welded assembly is tempered by maintaining the welded assembly at specified temperatures. The length of time for tempering will vary depending on the thickness of the welded assembly. The preferred length of time for the tempering step is about one hour for each inch of thickness of the metal assembly to be tempered.

When GTAW or SAW techniques are to be used with the filler metal in the form of a solid rod or solid wire and hydrogen sulfide service is anticipated, the preferred method for welding stainless steel components, preferably type 13Cr-4NI stainless steel, includes the steps of:

(a) providing stainless steel components, preferably made from type 13Cr-4Ni stainless steel;

(b) austenitizing the stainless steel components at a temperature of about 1820° F.–1950° F.;

(c) joining the components by welding using either GTAW or SAW techniques, wherein the filler metal alloy is in the form of a solid rod or solid wire and comprises in % by weight: up to 0.02%, or 0.0001–0.02% carbon; up to 0.6%, or 0.0001–0.6% manganese; up to 0.02%, or 0.0001–0.02% phosphorus; up to 0.015%, or 0.0001–0.015% sulfur; up to 0.6%, or 0.0001–0.6% silicon; 4.5–5.0% nickel; 0.4–0.7% molybdenum; 10–12.5% chromium; up to 0.1%, or 0.0001–0.1% copper; the balance being essentially iron and incidental impurities to provide a welded assembly;

(d) first stage tempering of the welded assembly at a temperature of about 1225° F.–1275° F.; and (e) second stage tempering of the welded and first stage tempered assembly at a temperature of about 1095° F.–1145° F.

When GTAW or SAW techniques are to be used with the filler metal in the form of a cored rod or cored wire and hydrogen sulfide service is anticipated, the preferred method for welding stainless steel components, preferably type 13Cr-4Ni stainless steel, includes the steps of:

(a) providing stainless steel components, preferably made from type 13Cr-4Ni stainless steel;

(b) austenitizing the stainless steel components at a temperature of about 1820° F.–1950° F.;

(c) joining the components by welding using either GTAW or SAW techniques, wherein the filler metal alloy is in the form of a cored rod or cored wire and comprises in % by weight: up to 0.02%, or 0.0001–0.02% carbon; up to 0.6%, or 0.0001–0.6% manganese; up to 0.015%, or 0.0001–0.015% phosphorus; Up to 0.015%, or 0.0001–0.015% sulfur; up to 0.3%, or 0.0001–0.3% silicon; 4.5–5.0% nickel; 0.4–0.7% molybdenum; 10–12.0% chromium; up to 0.1%, or 0.0001–0.1% copper; the balance being essentially iron and incidental impurities to provide a welded assembly;

(d) first stage tempering of the welded assembly at a temperature of about 1225° F.–1275° F.; and (e) second stage tempering of the welded and first stage tempered assembly at a temperature of about 1095° F.–1145° F.

When SMAW techniques are to be used with the filler metal alloy in the form of a covered electrode and hydrogen sulfide service is anticipated, the preferred method for welding stainless steel components includes the steps of:

(a) providing stainless steel components of a desired composition;

(b) austenitizing the stainless steel components at a temperature of about 1820° F.–1950° F.;

(c) joining the components by welding using a SMAW technique, wherein the filler metal alloy is in the form of a covered electrode and comprises in % by weight: up to 0.02%, or 0.0001–0.02% carbon; up to 0.8%, or 0.0001–0.8% manganese; up to 0.015%, or 0.0001–0.015% phosphorus; up to 0.015%, or 0.0001–0.015% sulfur; up to 0.3%, or 0.0001–0.3% silicon; 4.6–5.0% nickel; 0.4–0.7% molybdenum; 10–12.0% chromium; up to 0.1%, or 0.0001–0.1% copper; the balance being essentially iron and incidental impurities to provide a welded assembly;

(d) first stage tempering of the welded assembly at a temperature of about 1225° F.–1275° F.; and (e) second stage tempering of the welded and first stage tempered assembly at a temperature of about 1095° F.–1145° F.

When GTAW or SAW techniques are to be used with the filler metal in the form of a solid rod or solid wire and low temperature service as low as −152° F. is anticipated, the preferred method for welding stainless steel components, preferably 13Cr-4Ni stainless steel, includes the steps of:

(a) providing stainless steel components, preferably of type 13Cr-4Ni stainless steel;

(b) austenitizing the stainless steel components as described above at a temperature of about 1820° F.–1950° F.;

(c) tempering the stainless steel components at a temperature of about 950° F.–1120° F.;

(d) joining the components by welding using either GTAW or SAW techniques, wherein the filler metal alloy is in the form of a solid rod or solid wire and comprises in % by weight: up to 0.02%, or 0.0001–0.02% carbon; up to 0.6%, or 0.0001–0.6% manganese; up to 0.02%, or 0.0001–0.02% phosphorus; up to 0.015%, or 0.0001–0.015% sulfur; up to 0.6%, or 0.0001–0.6% silicon; 4.5–5.0% nickel; 0.4–0.7% molybdenum; 10–12.5% chromium; up to 0.1%, or 0.0001–0.1% copper; the balance being essentially iron and incidental impurities to provide a welded assembly; and (e) tempering the welded assembly at a temperature of about 930° F.–1120° F.

When GTAW or SAW techniques are to be used with the filler metal in the form of a cored rod or cored wire and low temperature service as low as −152° F. is anticipated, the preferred method for welding stainless steel components, preferably 13Cr-4Ni stainless steel, includes the steps of:

(a) providing stainless steel components, preferably of type 13Cr-4Ni stainless steel;

(b) austenitizing the stainless steel components at a temperature of about 1820° F.–1950° F.;

(c) tempering the stainless steel components at a temperature of about 950° F.–1120° F.;

(d) joining the components by welding using either the GTAW or SAW techniques, wherein the filler metal alloy is in the form of a cored rod or cored wire and comprises in % by weight: up to 0.02%, or 0.0001–0.02% carbon; up to 0.6%, or 0.0001–0.6% manganese; up to 0.015%, or 0.0001–0.015% phosphorus; up to 0.015%, or 0.0001–0.015%.sulfur; up to 0.3%, or 0.0001%–0.3% silicon; 4.5–5.0% nickel; 0.4–0.7% molybdenum; 10–12.0% chromium; up to 0.1%, or 0.0001–0.1% copper; the balance being essentially iron and incidental impurities to provide a welded assembly; and (e) tempering the welded assembly at a temperature of about 930° F.–1120° F.

When GTAW or SAW welding techniques are used in the joining step (d) of the present invention, it is preferred that the heat input does not exceed 50,000 joules per inch.

When a SMAW welding technique is used with the filler metal in the form of a covered electrode and low temperature service as low as −152° F. is anticipated, the method for welding stainless steel components, preferably 13Cr-4Ni stainless steel, includes the steps of:

(a) providing stainless steel components, preferably of type 13Cr-4Ni stainless steel;

(b) austenitizing the stainless steel components at a temperature of about 1820° F.–1950° F.;

(c) tempering the stainless steel components at a temperature of about 950° F.–1120° F.;

(d) joining the stainless steel components by welding using a SMAW technique, wherein the filler metal alloy is in the form of a covered electrode and comprises in % by weight: up to 0.02%, or 0.0001–0.02% carbon; up to 0.8%, or 0.0001–0.8% manganese; up to 0.015%, or 0.0001–0.015% phosphorus; up to 0.015%, or 0.0001–0.015% sulfur; up to 0.3%, or 0.0001–0.3% silicon; 4.6–5.0% nickel; 0.4–0.7% molybdenum; 10–12.0% chromium; up to 0.1%, or 0.0001–0.1% copper; the balance being essentially iron and incidental impurities to provide a welded assembly; and (e) tempering the welded assembly at a temperature of about 930° F.–1120° F.

A preferred embodiment of the present invention comprises using any of the methods described above for welding, wherein the metal components are stainless steel, preferably martensitic stainless steel and most preferably 13Cr-4Ni stainless steel and are in the form of the blades, hub, and cover components of an impeller assembly. The resulting impeller assembly is preferably used in a compressor.

A preferred stainless steel alloy composition for use in the components of the present invention is 13Cr-4Ni stainless steel. Alloy 13Cr-4Ni comprises in % by weight: 0.015–0.03% carbon; 12–14% chromium; 3.5–4.5% nickel; 0.3–0.7% molybdenum; 0.3–0.6% silicon; 0.5–1% manganese; up to 0.025% phosphorus; 0.005% sulfur; 0.02–0.05% nitrogen; the balance being essentially iron and incidental impurities.

Figure 2:
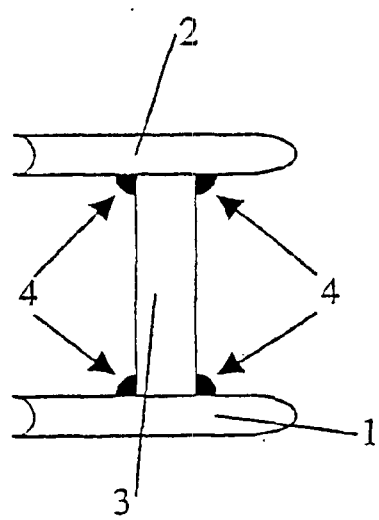
FIG. 2 is a cross section of an impeller blade, taken along section line II—II in FIG. 1.

Referring to FIGS. 1 and 2, a compressor impeller assembly 6 according to the present invention is shown. The impeller assembly 6 includes a hub 1, and a cover 2 with integral blade 3 joined thereto by weld beads 4. The impeller assembly 6 also includes a bore 5 for fitting on a drive shaft of a compressor (not shown). A first side of blade 3 is welded to a side of hub 1 and an opposite side of blade 3 is welded to a side of cover 2. In a preferred embodiment of the present invention, the hub 1, cover 2 and blade 3 are made of stainless steel, preferably martensitic stainless steel and, most preferably, type 13Cr-4Ni stainless steel. The filler metal alloy which forms the weld beads 4 is the filler metal alloy composition of the present invention. A plurality of blades 3 is joined to the hub 1 in this manner to complete the construction of the impeller assembly 6 according to one aspect of the invention.

Impeller assemblies 6 manufactured using the methods and weld filler alloys of the present invention have been found to meet the NACE MR0175 requirements for hydrogen sulfide service and, in addition, also demonstrate the required toughness for temperature service, i.e., temperatures as low as −152° F., as measured by the Charpy V-notch impact test.

The above-described methods, when used to produce impellers for use in compressors, also provide a more efficient impeller fabrication process. The methods of the present invention require lower preheat temperatures while not requiring a complete heat treatment of the resulting impeller assembly. The impellers derived in accordance with the present invention also add efficiency by providing general use compressor impellers of one material as opposed to customizing the material of construction for each intended service condition. The improved weldability of the preferred 13Cr-4Ni stainless steel with the filler metal alloy of the present invention reduces repair costs and manufacture cycle time. These improvements reduce overall manufacturing costs for the resulting compressor impeller assembly.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

We claim:

1. A filler metal alloy composition for welding consisting essentially of in % by weight:

up to 0.02% carbon;
up to 0.8% manganese;
up to 0.02% phosphorus;
up to 0.015% sulfur;
up to 0.6% silicon;
4.5% to 5.5% nickel;
0.4% to 0.7% molybdenum;
10% to 12.5% chromium;
up to 0.1% copper;
the balance being essentially iron and incidental impurities.

2. The filler metal alloy composition of claim 1, wherein the content of manganese is up to 0.6% and the content of nickel is 4.5% to 5.0%.

3. The filler metal alloy composition of claim 1, wherein the content of manganese is up to 0.6%; the content of phosphorus is up to 0.015%; the content of silicon is up to 0.3%; the content of nickel is 4.5% to 5.0%; and the content of chromium is 10% to 12%.

4. The filler metal alloy composition of claim 1, wherein the content of phosphorus is up to 0.015%; the content of silicon is up to 0.3%; the content of nickel is 4.6% to 5.0%; and the content of chromium is 10% to 12%.

5. A method of welding stainless steel components comprising the steps of:

(a) providing stainless steel components of a desired stainless steel composition;

(b) austenitizing the stainless steel components to be welded at a temperature of about 1800° F.–2000° F.;

(c) joining the components by welding, using an arc welding technique and using a filler metal alloy comprising in % by weight:
up to 0.02% carbon;
4.5–5.5% nickel;
0.4–0.7% molybdenum;
10–12.5% chromium;
0.1% copper;
up to 0.8% manganese;
up to 0.02% phosphorus;

up to 0.015% sulfur;
up to 0.6% silicon;
the balance being essentially iron and incidental impurities to provide a
welded assembly; and
(d) tempering the welded assembly at a temperature of about 930° F.–1300° F.

6. The method of claim 5, wherein the stainless steel components provided in step (a) comprise martensitic stainless steel.

7. The method of claim 6, wherein the martensitic stainless steel components are type 13Cr-4Ni stainless steel.

8. The method of claim 5, wherein the components to be welded are joined to form an impeller assembly.

9. The method of claim 8, wherein the impeller is used in a compressor.

10. The method of claim 5, wherein the austenitizing step (b) is conducted at a temperature of 1820° F.–1950° F.; the arc welding of the joining step (c) is done using one of a gas tungsten arc welding or submerged arc welding techniques; wherein the filler metal alloy is in the form of a solid rod or solid wire and comprises up to 0.6% manganese and 4.5–5.0% nickel; wherein the tempering step (d) is conducted at a temperature of 1095° F.–1145° F.

11. The method of claim 10, wherein the filler metal alloy is in the form of a cored rod or cored wire and the composition of the filler metal alloy comprises in % by weight: up to 0.015% phosphorus; up to 0.3% silicon; 4.5–5.0% nickel; and 10–12% chromium.

12. The welding method of claim 5, wherein the austenitizing step (b) is conducted at a temperature of 1820° F.–1950° F.; the arc welding of the joining step (c) is conducted using a shielded metal arc welding technique; wherein the filler metal alloy is in the form of a covered electrode and the composition of the filler metal alloy comprises up to 0.015% phosphorus; up to 0.3% silicon; from 4.6–5.0% nickel; 10–12% chromium; wherein the tempering step (d) is conducted at a temperature of 1225° F.–1275° F.; and wherein a secondary tempering step is conducted following tempering step (d) at a temperature of 1095° F.–1145° F.

13. The welding method of claim 5, wherein the austenitizing step (b) is conducted at a temperature of 1820° F.–1950° F.; the arc welding of joining step (c) is conducted using one of a gas tungsten arc welding or submerged arc welding technique and the filler metal alloy is in the form of a solid rod or solid wire and comprises up to 0.6% manganese and 4.5–5.0% nickel; and wherein the tempering step (d) is conducted at a temperature of 930° F.–1120° F.

14. The welding method of claim 13, wherein the filler metal alloy is in the form of a cored rod or cored wire; and the composition of the filler metal alloy comprises up to 0.015% phosphorus; up to 0.3% silicon; and 10–12% chromium.

15. The welding method of claim 5, wherein the austenitizing step (b) is conducted at a temperature of 1820° F.–1950° F.; the arc welding of the joining step (c) is conducted using a shielded metal arc welding technique and the filler metal alloy is in the form of a covered electrode and wherein the composition of the filler metal alloy comprises up to 0.015% phosphorus; up to 0.3% silicon; 4.6–5.0% nickel; 10–12% chromium and wherein the tempering step (d) is conducted at a temperature of 930° F.–1120° F.

16. An impeller made by the method of claim 5 wherein welds of the welded assembly have a maximum Rockwell C Hardness (HRC) of 23 and wherein the stainless steel components comprise at least one hub, at least one cover and a plurality of blades.

17. The impeller of claim 16, wherein the stainless steel components are formed of a martensitic stainless steel.

18. The impeller of claim 16, wherein the stainless steel is a type 13Cr-4Ni stainless steel and the weld filler metal alloy comprises up to 0.6% manganese and 4.5–5.0% nickel.

19. The impeller of claim 16, wherein the stainless steel is a type 13Cr-4Ni stainless steel and the weld filler metal alloy comprises up to 0.6% manganese; up to 0.015% phosphorus; up to 0.3% silicon; 4.5–5.0% nickel; and 10–12% chromium.

20. The impeller as claimed in claim 16, wherein the stainless steel is 13Cr-4Ni stainless steel and the weld filler metal alloy comprises up to 0.015% phosphorus; up to 0.3% silicon; 4.6–5.0% nickel; and 10–12% chromium.

21. An impeller for use in a compressor for exposure to petrochemical corrosive fluids and low temperature service, said impeller comprising:
a central hub;
an outer cover spaced from the central hub;
a plurality of blades having opposed elongated edge portions wherein a first edge portion of each blade is joined by welding to the central hub of the impeller and an opposed edge portion of each blade is joined by a welding bead to the outer cover of the impeller;
wherein the blades, hub and cover are made from a type 13Cr-4Ni stainless steel; and
wherein the weld bead joining the blades to the hub and cover has a maximum Rockwell C Hardness (HRC) of 23 and is formed by a filler metal alloy comprising in % by weight: up to 0.02% carbon, up to 0.8% manganese, up to 0.02% phosphorus, up to 0.015% sulfur, up to 0.6% silicon, 4.5–5.5% nickel, 0.4–0.7% molybdenum, 10–12.5% chromium, up to 0.1% copper, the balance essentially iron and incidental impurities.

22. An article for use in a hostile environment including exposure to corrosive petrochemical fluids and low temperatures, said article comprising a plurality of components made from type 13Cr-4Ni stainless steel, wherein said components are joined together by a plurality of weld beads and wherein said weld beads have a maximum rockwell hardness (HRC) of 23 and are formed by a filler metal alloy comprising in % by weight: up to 0.02% carbon, up to 0.8% manganese, up to 0.02% phosphorus, up to 0.015% sulfur, up to 0.6% silicon, 4.5–5.5% nickel, 0.4–0.7% molybdenum, 10–12.5% chromium, up to 0.1% copper, the balance essentially iron and incidental impurities.

* * * * *